United States Patent [19]

Engler, III, et al.

[11] Patent Number: 5,452,751
[45] Date of Patent: Sep. 26, 1995

[54] MULTI-PURPOSE ROUTER BASEPLATE

[76] Inventors: Nicholas A. Engler, III; James M. McCann, both of P.O. Box 203, West Milton, Ohio 45383

[21] Appl. No.: 276,305

[22] Filed: Jul. 18, 1994

[51] Int. Cl.⁶ .................................. B23C 1/20; B27C 5/10
[52] U.S. Cl. ................ 144/1 F; 144/134 D; 144/136 C; 144/144 R; 409/175
[58] Field of Search ................ 144/1 E, 1 F, 83, 144/134 R, 134 D, 136 R, 136 C, 371, 144 R, 137; 33/27.03, 27.031, 27.032, 27.033, 18.1, 19.2; 409/144, 175, 176, 177, 178, 179, 180, 181, 182

[56] References Cited

U.S. PATENT DOCUMENTS

| | | | |
|---|---|---|---|
| 4,197,887 | 4/1980 | Groves | 144/136 C |
| 4,294,297 | 10/1981 | Kieffer | 144/134 D |
| 4,685,496 | 8/1987 | Livick | 144/1 F |
| 4,763,707 | 8/1988 | Hounshell | 144/136 C |
| 5,183,373 | 2/1993 | Floyd, Jr. | 144/134 D |

FOREIGN PATENT DOCUMENTS

3917812  12/1990  Germany ................ 144/1 F

Primary Examiner—W. Donald Bray
Attorney, Agent, or Firm—Joseph G. Nauman

[57] ABSTRACT

A multi-purpose router baseplate accessory is configured to perform eight different woodworking tasks. The accessory includes a rectangular rigid transparent plate with a pair of handles, at least one of which is readily removable, and two separate mounting locations for a router. When attached to the base of a router, this accessory serves as 1) an extended baseplate with the router centered on the baseplate, 2) an offset baseplate with the router attached toward one end of the baseplate, 3) a circle-cutting jig using a series of accurately placed pivot location holes located along two different radii from one of the mounting locations, 4) an aid in cutting woodworking joints such as dados wherein the center of the mounting location, and the router shaft, is eccentric with respect to the adjacent sides of the baseplate by predetermined measurements, 5) a holder for a guide collar (itself another router accessory) at either of the mounting locations, 6) an aid to making cemtered mortises along a surface of a workpiece, 7) an aid in trimming and planing wood surfaces, and 8) a mounting plate to hold a router stationary in a stand or other fixture.

9 Claims, 2 Drawing Sheets

MULTI-PURPOSE ROUTER BASEPLATE

FIELD OF THE INVENTION

The invention relates to a multi-purpose accessory baseplate for a portable power router.

BACKGROUND OF THE INVENTION

Various designs of baseplate accessories are available for different makes of portable power routers, which are a well known power tool for woodworking and use with equivalent wood-like materials. Different ones of these baseplate accessories are capable, individually, of expediting the routing of circles (sometimes called compass jigs), or the use of the router in situations where an extended (or irregular shaped, often a rounded triangular shape) baseplate can stabilize the router as it is moved along a margin or edge of a workpiece with a major part of the router projecting beyond any support from below. Such accessories also are available (often called table inserts) for mounting portable routers to a stand or jig whereby the router is stationary and work is guided past the router bit. However, each such accessory has, as a rule, only one use, and separate special baseplates must be interchanged to accommodate the needs of different routing tasks. Some specialty tool suppliers even offer small sheets of clear acrylic plastic, or of phenolic materials, to the end user for construction of tailor made baseplates or jigs. Thus, there is a need for a multi-purpose baseplate accessory which can assist or simplify a number of different tasks, and which can be purchased ready to use.

SUMMARY OF INVENTION

The multi-purpose router baseplate accessory of the present invention is configured to perform a plurality (actually eight) different woodworking tasks. When attached to the base of a router, it serves as a) an extended baseplate, b) an offset baseplate, c) a circle-cutting jig, d) an aid in cutting woodworking joints such as dados, e) a holder for a guide collar (itself another router accessory), f) an aid in trimming and planing wood surfaces, g) a self-centering slot mortising guide, and h) mounting plate to hold a router stationary in a stand or other fixture.

The primary object of the invention, therefore, is to provide such a multi-purpose router baseplate having combinations of the functions described above, and as more fully set forth in the detailed description of the preferred embodiment.

Other objects and advantages of the invention will be apparent from the following description, the accompanying drawings and the appended claims.

DESCRIPTION OF PREFERRED EMBODIMENT

Figure 1:
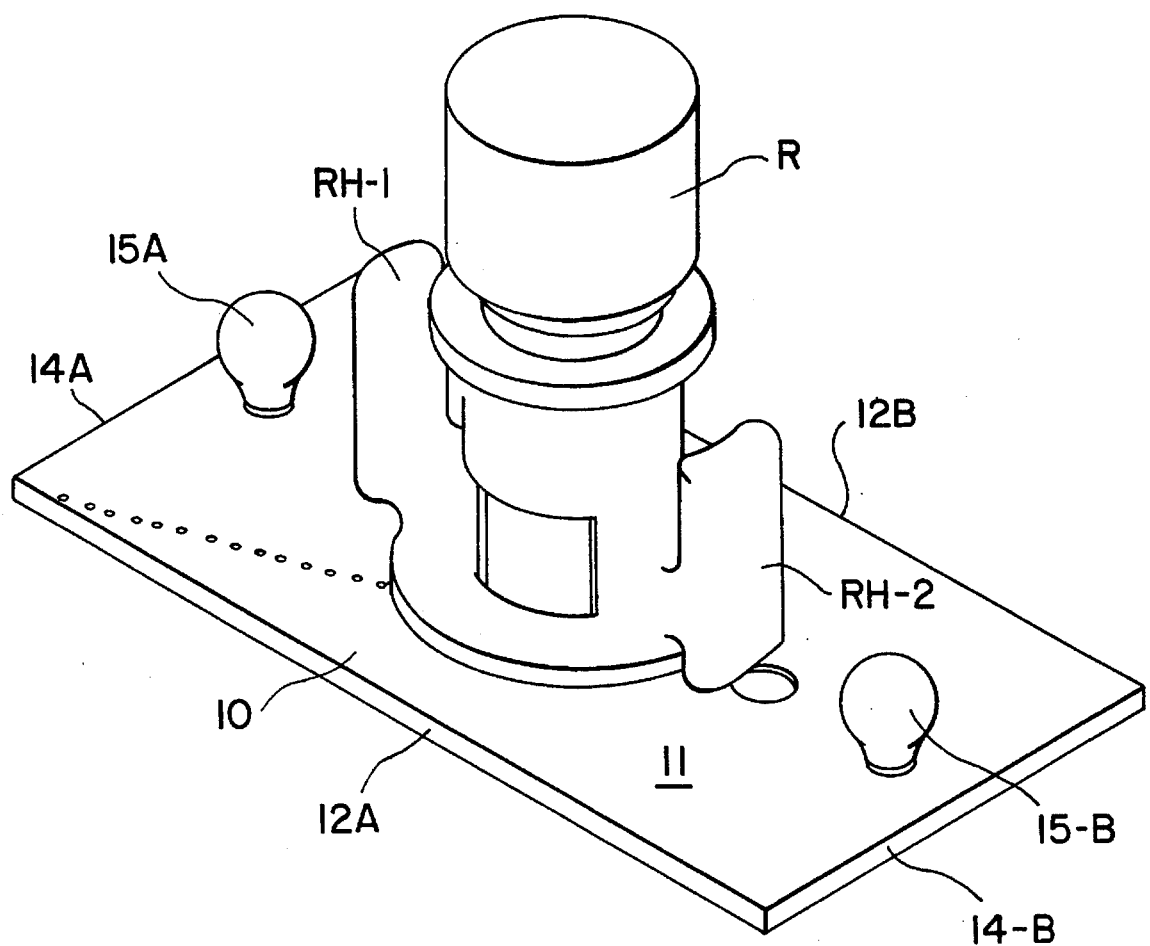
FIG. 1 is a perspective view of a typical portable power router fitted with a multi-purpose accessory baseplate device according to the invention.
Figure 2:
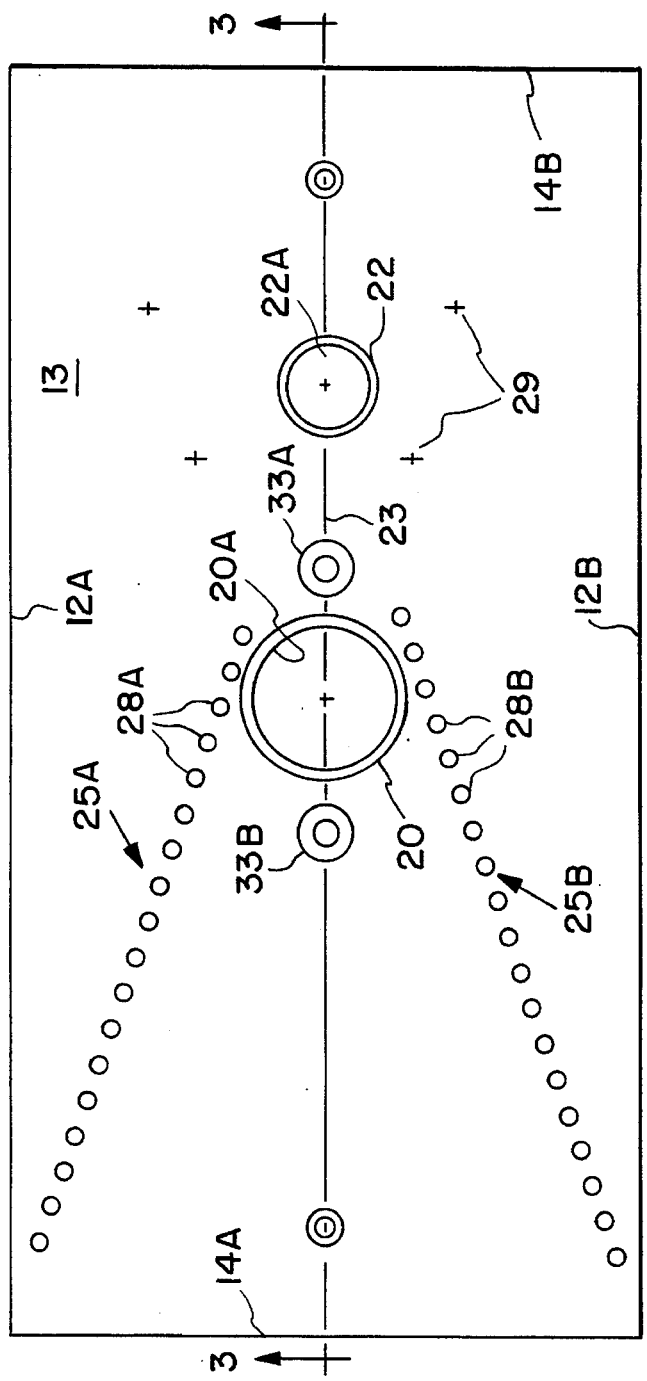
FIG. 2 a bottom plan view of a multi-purpose router baseplate according to the invention.
Figure 3:
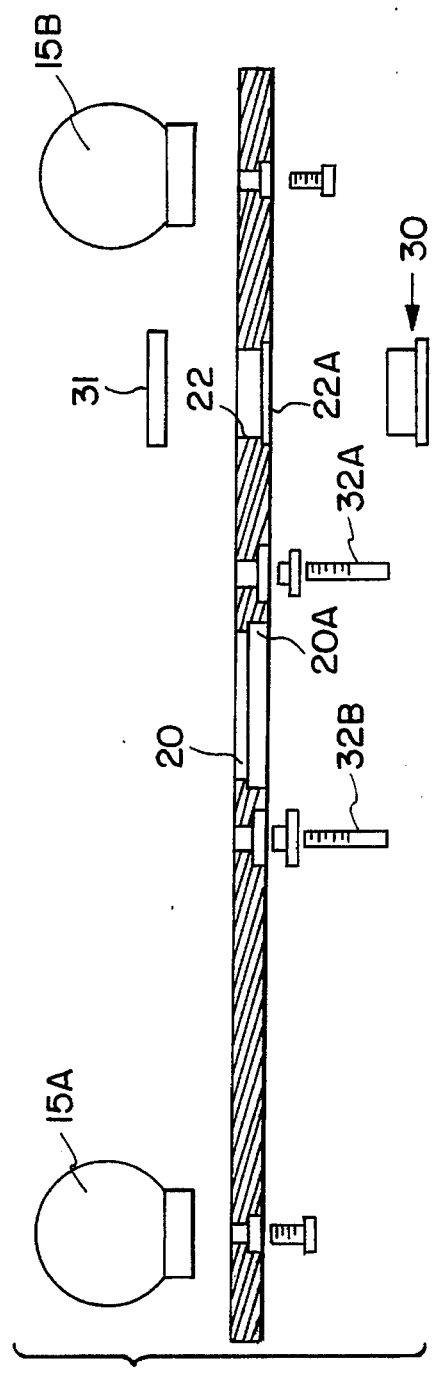
FIG. 3 is a cross-section view taken along line 3—3 in FIG. 2.

Referring to FIGS. 1, 2 and 3, the baseplate accessory is preferably in the form of a relatively stiff or rigid rectangular plate 10 having a flat top surface 11, longer ends or edges 12A and 12B, shorter ends or edges 14A, 14B, and a flat bottom surface 13. The plate 10 is of uniform thickness and is made from transparent acrylic plastic, although other materials (such a polycarbonate sheet or phenolic sheet) having the requisite stiffness, smooth and accurate surfaces, and wear resistance can be used. By way of example only, in an actual embodiment of the invention plate 10 is seventeen inches long (edges 12A, 12B) by eight inches wide (edges 14A, 14B). There are two knobs or handles 15A and 15B attached to plate 10 near its opposed narrower ends 14A, 14B to help guide and control the plate when using it with a portable power router R attached thereto; the router is shown only in general outline, since the accessory baseplate of the invention can be adapted for attachment to a number of different types and makes of portable power routers. Handles 15A and 15B are readily removed from and replaced on the plate 10.

Router 18 can be mounted in two positions, indicated at I or II, either above the large hole 20 at position I, generally in the center of the plate, or above and aligned with the somewhat smaller hole 22 to one side of plate 10, closer to end 14A. Each of holes 20 and 22 preferably includes a counterbore 20A, 22A respectively, on the bottom of plate 10. Holes 20, 22 are located on a line 23 which is parallel to the longer ends or edges 12A, 12B and slightly closer to edge 12B than to edge 12A by a predetermined small distance, for example ⅟32nd of an inch. At least one handle 15B can be removed as needed, in which case the user can utilize the other handle 15A along with one or both of the handles RH-1 and RH-2 which are a part of the router structure. Since different router constructions will have unique locations of mounting holes in the router base, the plate 10 may not be drilled to accommodate mounting screws for attaching the router R. Rather, the user will drill the necessary holes to accommodate his style of router, so as to mount it with is vertical output shaft coincident with the center of either hole 20, at position I, or hole 22, at position II. Typical centers 29 for mounting holes may be marked on the baseplate to be used with appropriate instructions.

There are two rows 25A and 25B of small holes (preferably equal in size) which can be used to provide different pivot points for baseplate 10 around a chosen centerpoint, or alternatively used to attach a broad flat piece of wood or similar material to plate 10, as later described. The two rows of holes 28A, 28B are located and aligned along different radii from the center of position II and hole 22, and the individual holes are regularly spaced apart along the radius on which they are located, for example at a spacing of ½ inch. In addition, the most inboard holes 28A and 28B in rows 25A and 25B (closest to position II) are located at different distance from the center of position II, as by ¼ inch. Thus the evenly spaced holes provide selectable pivot locations, in ¼ inch increments, for pivoting or rotating motion of baseplate 10 about a chosen pivot point.

The multi-purpose router baseplate accessory of the invention can be used to perform seven different routing tasks by configuring it in different ways, as follows.

To provide an extended baseplate, the router is mounted to the baseplate 10 at position I, over the larger hole 20, thus centered on plate 10. The user can then grasp the handles 15A, 15B to guide the tool as routing proceeds. Because handles 15A, 15B are further away from the center of cutting tool rotation than the router's own handles RH-1, RH-2 leverage is increased for the user and the router is easier to control.

To use the accessory as an offset baseplate, router R ia attached to baseplate 10 at position II, over the smaller hole 22. If necessary, handle 15B nearest to hole 22 can be removed to accommodate the router mounted in this position. The remaining knob 15A and one of the router's handles is grasped to guide the tool during use and, when routing near the edge of a workpiece, to keep the majority of baseplate 10 over the work. Because the baseplate extends several inches to one side of the router, it provides a more stable base, better leverage, and helps keep the router from tipping over the edge.

To utilize the accessory as a circle-cutting jig, router R is attached to plate 10 in position II, over the hole 22. Again, if necessary handle 12B can be removed to accommodate the router. By placing baseplate 10 over a workpiece, and driving a short screw, nail or pin (not shown) through a selected one of the small holes in rows 25A, 25B and into the workpiece to serve as a pivot, the baseplate and router R can be swung around such pivot or center point, thereby routing an arc or a circle. This arrangement provides pivot hole locations at regular intervals (every ¼ inch, beginning 3–¼ inches from the center of hole 22 in the stated dimension examples), to achieve cutting of arcs or circles of predetermined radius. In the illustrated accessory, it is possible to rout circles of various diameters, from a smallest circle of 6 inches increasing in increments of ⅛ inch, using a ¼, ⅜, ½, or ⅝ inch-diameter cutter.

To use the baseplate accessory as a joint-cutting aid, router R can be attached to plate 10 in position II, with the router cutting tool precisely centered with respect to hole 22. Again, if necessary handle 15B can be removed. By employing a straightedge to guide a chosen edge of baseplate 10, which edge is moved along and in contact with the straightedge, it is possible to rout dadoes, rabbets, grooves, and similar joints. By keeping one of the three edges nearest the hole 22, namely edges 12A, 12B or 14A, against the straightedge as routing proceeds, is possible to cut an edges or groove at predetermined different spacing from the straightedge location. This feature is available because edge 12A is ¹⁄₃₂ inch further away from the center of hole 22 than edge 12B, and edge 14B is ³⁄₃₂ inch further away from the center of hole 22 than edge 12B. This arrangement facilitates routing joints in ¹⁄₃₂ inch increments or to widen a cut by ¹⁄₃₂ inch without changing cutting tools (bits), simply by making two passes with the same router cutting tool, by keeping edge 12B against the straightedge for the first pass, and edge 14B against the straightedge for the second pass. In particular, this feature allows easy routing of dadoes and grooves to fit standard ¼–, ⅜–, ½–, and ¾-inch plywood, since all plywood is ¹⁄₃₂ inch under its nominal size (under U.S. standards). Typically, using a cutting tool ⅛ inch smaller than the nominal size, the joint groove is made in two passes, by keeping edge 12B against the straightedge for the first pass, and edge 14B against it for the second pass.

To rout with a guide-collar holder, a standard-size guide collar 30 (commercially available in various sizes of outer diameter and a lip of common diameter) is fitted into hole 22 so the lip of collar 30 fits in counterbore 22A; such counterbore is sized to receive the common lip diameter of the various collars. Collar 30 is secured in place with its retaining nut 31. Then router R is attached to baseplate 10 in position II, with its shaft and cutting tool precisely centered over hole 22. Again, if necessary remove handle 15B to accommodate router R. The router depth-of-cut is adjusted so the cutting tool protrudes through collar 30 by a desired dimension. Then, a template piece (a flat board cut in a two-dimensional shape) is fastened to the workpiece and as routing proceeds, guide collar 30 is kept against the template to guide baseplate 10. The template is not shown since it may be of many shapes and sizes, its use is well known, and it does not per se form a part of this invention.

To route centered mortises in the surface of a piece of wood, the router R is attached to baseplate 10 in position I with its shaft and cutting tool recisely centered over hole 20. The two pins 32A and 32B are threaded into holes 33A and 33B in the underside of baseplate 10. The router depth-of-cut is set so the cutting toll protrudes through the baseplate 10 to the desired depth. With the router on (powered) this assembly is then set upon the wood workpiece with each pin positioned against opposite sides of the workpiece, perpendicular to the face to be cut. The rotating bit is then lowered into the workpiece a pre-set amount. While continuing to hold each pin against the two workpiece surfaces, router R is slid over the workpiece surface to the desired mortise length. The depth-of-cut may then be repositioned and the cut repeated as necessary.

To use the router and this accessory plate as a trimmer/planer, a flat board is fastened to the bottom of baseplate 10 by driving screws through several of the small pivot holes and into the board. The board should cover the central hole 20 at location I, but not hole 22. Attach router R to the baseplate 10 in position II, with its shaft over, and aligned with the center of, hole 22. A flat-bottom cutting tool is fitted in router R and the router depth-of-cut is adjusted so the bottom of the cutting tool is flush with the bottom face of the attached board. Then, baseplate 10 can be moved across the workpiece like a hand plane, trimming protruding parts with the cutting tool. The router cutting tool will cut all protrusions flush with the workpiece surface.

To use the accessory of the invention as a mounting plate, router R is attached to baseplate 10 in position I, with its shaft over and concentric with the central hole 20. If not already available, a mortise can be formed in the surface of a stand to fit the perimeter of baseplate 10, then the baseplate is secured in this mortise, fastening down all four edges 12A, 12B, 14A, 14B. If necessary, one or both of handles 15A and 15B can be removed. In the same fashion, baseplate 10 can be mounted to a horizontal stand surface, thus baseplate 10 can hold router R with its shaft and cutting tool horizontal or vertically, above the work, below it, or beside it.

While the form of apparatus herein described constitutes a preferred embodiments of this invention, it is to be understood that the invention is not limited to this precise forms of apparatus, and that changes may be made therein without departing from the scope of the invention which is defined in the appended claims.

What is claimed is:

1. An accessory for a portable power driven cutting device, such as a router, comprising a plate having top and bottom surfaces and also having at least first and second opposite parallel edges, means defining two separate mounting locations for attachment of a portable cutting device to said plate, including first and second mounting holes for passage of a cutting tool through said plate, said holes being located along a line parallel to said opposite edges, said first hole being centered on a location which is generally central of said plate and said second hole being located offset on said plate from said first hole, and a first series of a plurality of pivot holes formed through said plate in regularly spaced locations aligned along a first radius line extending along said plate and intersecting the center of one of said mounting holes.

2. An accessory as defined in claim 1, wherein said aligned first series of pivot holes are located on a first radius line which intersects the center of said second mounting hole and extends across said plate to one side of said first mounting hole.

3. An accessory as defined in claim 2, further including a second series of pivot holes positioned along a second different radius line intersecting the center of said second mounting hole and extending across said plate past an opposite side of said first mounting hole, said second series of pivot holes being spaced apart at the same incremental distance as said first series of pivot holes, and said second series of pivot holes being located at points along said second radius line intermediate the location of said first series of pivot holes along said first radius line.

4. An accessory as defined in claim 1, wherein said plate is rectangular in shape and said first mounting hole is generally centered on said plate, said plate having third and fourth additional parallel edges extending perpendicular to said first and second opposite parallel edges.

5. An accessory as defined in claim 4, wherein said first, second, third and fourth edges are each located at predetermined different spacings from said line intersecting said mounting holes, whereby the tool of a cutting device extending through one of said mounting holes is spaced a different predetermined distance from each of the four edges of said plate.

6. An accessory as defined in claim 1, further including a pair of removable pins depending from said bottom surface of said plate adjacent and on opposite sides of said first mounting hole to engage opposite sides of a workpiece and to assist in routing a centered mortise along the workpiece.

7. An accessory for a portable power driven cutting device, such as a router, comprising a rectangular plate having top and bottom surfaces and also having at least first and second opposite parallel edges, means defining a mounting location for attachment of a portable cutting device to said plate, including a first mounting hole for passage of a cutting tool through said plate, the center of said hole being located along a line parallel to said opposite edges, a first series of a plurality of pivot holes formed through said plate in regularly spaced locations aligned along a first radius line extending along said plate and intersecting the center of said mounting hole, a second series of pivot holes positioned along a second different radius line intersecting the center of said mounting hole and extending across said plate in divergence with respect to said first radius line, said second series of pivot holes being spaced apart at the same incremental distance as said first series of pivot holes, and said second series of pivot holes being located at points along said second radius line intermediate the location of said first series of pivot holes along said first radius line.

8. An accessory as defined in claim 7, further including a pair of removable pins depending from said bottom surface of said plate adjacent and on opposite sides of said mounting hole to engage opposite sides of a workpiece and to assist in routing a centered mortise along the workpiece.

9. An accessory as defined in claim 7, wherein said plate is rectangular in shape and said mounting hole is generally centered on said plate, said plate having third and fourth additional parallel edges extending perpendicular to said first and second opposite parallel edges, said first, second, third and fourth edges each located at predetermined different spacings from said the center of said mounting hole, whereby the tool of a cutting device extending through said mounting hole is spaced a different predetermined distance from each of the four edges of said plate.

* * * * *